United States Patent [19]
Werner

[11] 3,901,963
[45] *Aug. 26, 1975

[54] REINFORCEMENT FOR PIPE COATINGS

[76] Inventor: Arthur D. Werner, 6303 Kury, Houston, Tex. 77008

[ * ] Notice: The portion of the term of this patent subsequent to Sept. 23, 1990, has been disclaimed.

[22] Filed: July 26, 1973

[21] Appl. No.: 383,032

Related U.S. Application Data

[63] Continuation-in-part of Ser. No. 140,655, May 6, 1971, Pat. No. 3,761,557.

[52] U.S. Cl. .............. 264/228; 138/176; 156/172; 156/392; 156/429; 264/309; 425/111
[51] Int. Cl.² .......................................... B28B 1/32
[58] Field of Search .......... 156/172, 173, 175, 392, 156/429, 430, 431, 432, 161; 264/228, 271, 309; 118/320, 321; 138/175, 176; 425/110, 111

[56] References Cited
UNITED STATES PATENTS

| | | | |
|---|---|---|---|
| 1,966,725 | 7/1934 | Kraner | 264/271 |
| 2,368,742 | 2/1945 | Brend | 118/321 |
| 2,373,638 | 4/1945 | Perkins | 118/320 |
| 2,696,353 | 12/1954 | Vessels | 156/172 |
| 2,945,278 | 7/1960 | Robertson | 425/113 |
| 3,700,527 | 10/1972 | Grosh | 156/174 |
| 3,711,361 | 1/1973 | Casadevall | 156/172 |
| 3,740,291 | 6/1973 | Mallard | 156/392 |
| 3,761,557 | 9/1973 | Werner | 264/228 |

*Primary Examiner*—Daniel J. Fritsch

[57] ABSTRACT

Reinforcement for pipe coatings comprising helically wound reinforcing wire imbedded in the pipe coating material and a plurality of relatively short, elongated wires or rods extending longitudinally of the pipe and transverse to the helical windings. The generally longitudinally extending wires or rods are initially held in place by the helical windings and may be introduced into the coating material either independently of the helical windings or secured to the latter. The invention also contemplates a method of reinforcing a pipe coating utilizing the helical windings with transversely extending projections secured thereto and projecting to one side or the other, or both. The helical winding is wound around the pipe as the coating material is projected onto the pipe surface. The strand of helical winding is also held tight under tension to draw it tight around the pipe.

3 Claims, 8 Drawing Figures

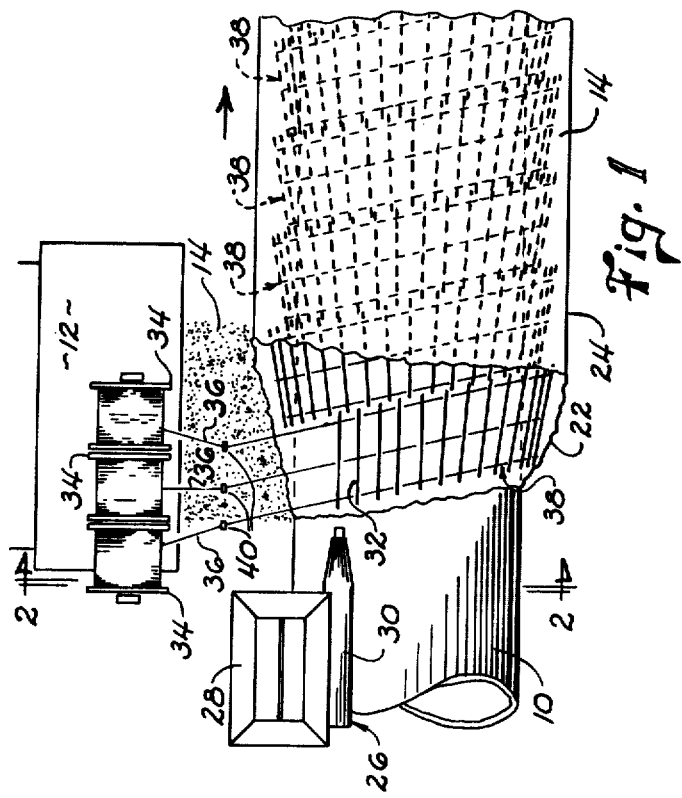
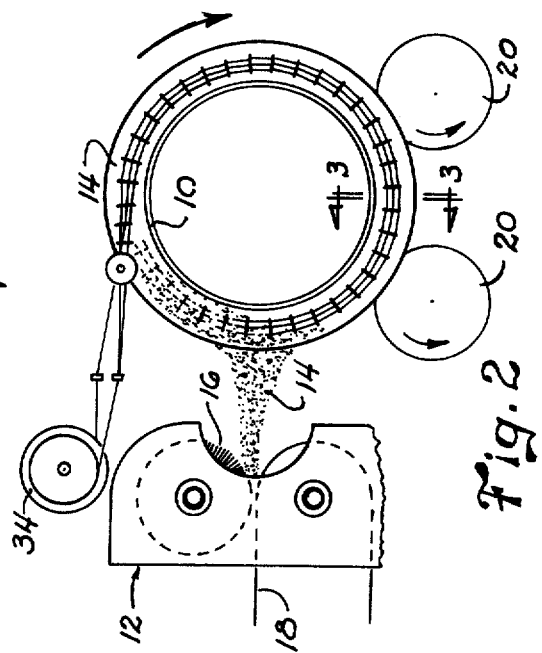
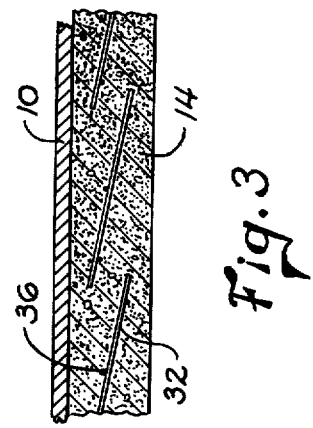
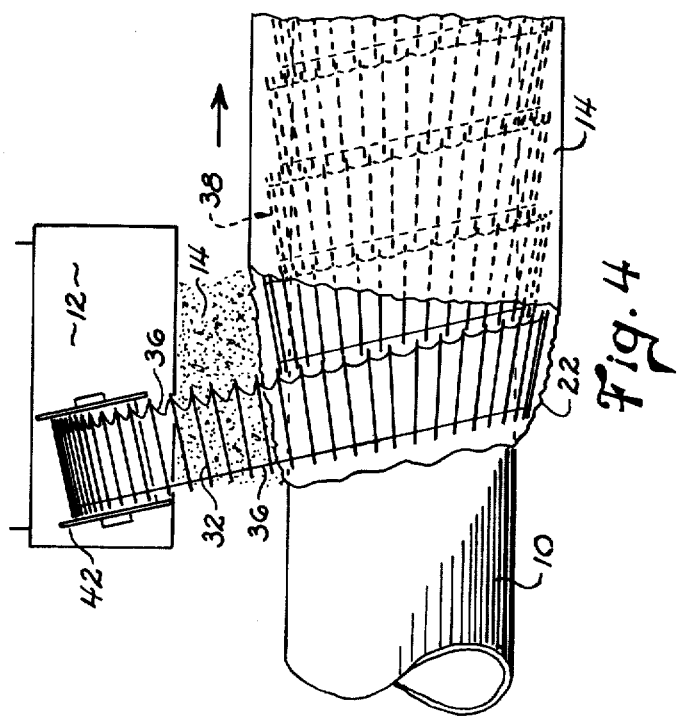

REINFORCEMENT FOR PIPE COATINGS

This invention is a continuation-in-part of application Ser. No. 140,655 filed May 6, 1971 entitled "METHOD OF REINFORCING PIPE COATINGS" now U.S. Pat. No. 3,761,557.

This invention relates to the coating of pipe and, more particularly, to a method and apparatus for reinforcing pipe coatings.

Antibouyancy weight coatings are conventionally applied to pipe joints which are to be installed in underwater pipelines. These coatings usually comprise one or more layers of heavy concrete. The concrete is sprayed or projected at high velocity against the pipe as the latter is both rotated and translated past the coating station.

A reinforcement is provided for the concrete coating, primarily to hold the concrete in place until it has set or hardened and also to provide reinforcing strength to the cured concrete. A continuous wire wound helically on the pipe and imbedded in the concrete coating during the coating operation has been used for this reinforcement. Such a continuous elongated wire can be applied to the pipe simultaneously with the application of the concrete coating and has the distinct advantage of economies of application and flexibility in the choice of wire size suitable for a particular coating.

Pipe coaters have been forced, however, to discontinue use of the elongated, continuous, simple wire reinforcement for coatings of this kind despite their advantages. Helical windings of wire of this kind do not provide adequate reinforcement for the concrete between the adjacent convolutions of the windings.

The reinforcement is applied and imbedded in the material as the concrete is projected against the pipe to build up the desired coating. Thus, the pipe is both rotated and translated longitudinally of the pipe during the coating operation. It would be difficult, if not impossible, to apply continuous reinforcement wires running longitudinally of the pipe, during the coating operation, especially in view of the rotation of the pipe on its longitudinal axis.

Accordingly, coaters have been forced to discontinue the use of the continuous single wire, helical wound reinforcements despite their obvious advantages in many other respects. Instead, they have resorted to the use of elongated strips of woven wire mesh reinforcements which are wound on the pipe helically during the coating operation. This type of prefabricated wire mesh (commonly called "key mesh") must be woven in advance of application, and is therefore much more costly than single strand wire. Further, because of the weaving or forming operation, the maximum diameter for the wire used in fabricating the mesh is limited. The use of relatively small diameter wire for this purpose usually dictates that the wire be protected by galvanizing or other means to insure that sufficient reinforcement strength remains in the wire after it has been exposed to weathering and other deteriorating agencies. This obviously greatly adds to the cost of the mesh reinforcement which is already expensive as a result of the fabricating operation.

Equipment to fabricate the wire mesh is not universally available. This often requires the expenditure of substantial amounts to ship rolls of prefabricated mesh to the coating site when such mesh is not locally available. This is particularly a problem in overseas coating operations since many foreign countries do not have facilities for producing the mesh reinforcement. On the other hand, rolls of continuous, single strand wire are widely available and in substantially any size desired for coating reinforcement purposes. The diameter chosen for such wire is not limited by the maximum size which can be handled by mesh forming machines, and the size can be large enough to provide the desired strength allowing for anticipated deterioration.

It is, therefore, an object of the present invention to provide pipe coating reinforcing structure utilizing wire stock which is easier and more economical to construct than "mesh" reinforcing wire.

It is also an aim of this invention to provide pipe coating reinforcing structure utilizing helically wound strand wire in combination with elongated laterally extending reinforcing lengths disposed generally longitudinally of a pipe which provides reinforcing strength of a magnitude comparable with that achieved utilizing mesh reinforcing wire.

Still another one of the objects of this invention is to provide a method of reinforcing pipe coatings utilizing strand wire having elongated reinforcing "barbs" extending laterally therefrom and generally longitudinally of the pipe which method is capable of being performed in a simple and economical manner.

These and other objects of the invention will be further explained or become apparent from the following description, claims and drawings.

In the drawings:

FIG. 1 is a top plan view of a joint of pipe undergoing application of a coating simultaneously with placement of the reinforcing structure of the invention;

FIG. 2 is a vertical cross-sectional view through the joint of pipe taken along line 2—2 of FIG. 1;

FIG. 3 is a greatly enlarged fragmentary cross-sectional view taken along line 3—3 of FIG. 2;

FIG. 4 is a top plan view, similar to FIG. 1, showing a modified form of the reinforcement structure of the invention;

Figure 5:
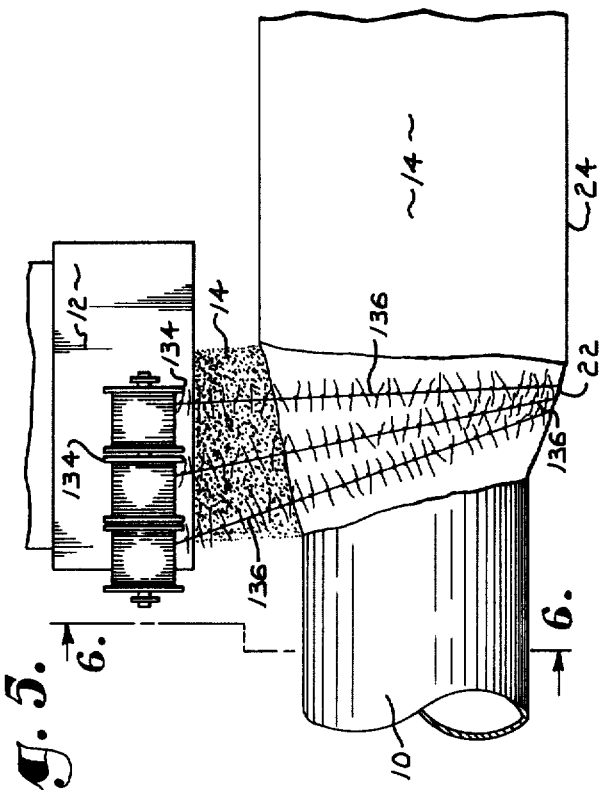
FIG. 5 is a top plan view, similar to FIG. 1, illustrating an alternative embodiment of the invention.

Referring initially to FIG. 1 of the drawing, a joint of pipe 10 is advanced past a coating station 12 where a heavy aggregate coating material 14 such as concrete is projected on the surface of the pipe by the action of a rotating brush 16 and a conveyor 18 (FIG. 2). As is well known by those skilled in the art, it is the practice to support the pipe 10 at either end by a pair of rollers 20 which rotate the pipe about its longitudinal axis while an appropriate carriage (not shown) advances the pipe longitudinally in the direction of the arrow in FIG. 1. This assures application of a uniform coating throughout the length of the pipe 10. Translation or advancement of the pipe during the coating operation causes the material 14 to build up at an angle relative to the surface of the pipe 10. This presents a frusto-conical surface 22 at the zone of application. The surface 22 merges into a planar surface 24 as the pipe 10 advances.

A thrower 26 having a storage hopper 28 and a projecting head 30 is positioned above the pipe 10 for delivering relatively short, rigid, elongated reinforcing elements in the nature of rods or lengths of wire 32 to the coating 14 on the surface of the pipe. Each of the rods 32 may be identical and they can be formed from readily available steel or wire stock in any length desired. The length should be sufficient that at least two adjacent convolutions of helically wound reinforcing wire traverse each rod as will be subsequently described. It is preferable, however, that the length of the rods 32 not exceed the transverse dimension of the surface 22 to assure that the rods will not project beyond the surface 24, although in those cases where the pipe 10 is to be coated in a multiple pass operation longer lengths for the rods 32 can be utilized and may even be desirable.

The rods 32 are projected onto the surface 22 and are immediately imbedded into the coating 14 as the latter continues to build up. The rods 32 should be projected onto the coating 14 at a slight angle relative to the surface of the pipe 10 so as to be parallel to the surface 22. This prevents voids in the coating material around and beneath the rods and assures maximum compaction of the material 14. The rods 32 are disposed around the entire circumference of the pipe 10 as the latter rotates and is advanced longitudinally in a circumferentially spaced, continuous helical configuration.

Simultaneously with application of the generally longitudinally oriented rods 32 to the coating, helical convolutions of reinforcement wire are wound around the pipe and imbedded in the coating. In the embodiment of apparatus to accomplish the invention shown in FIGS. 1 and 2 of the drawing, three spools 34 are disposed immediately above the coating station 12 and adjacent the rod thrower 26 for supplying continuous lengths of three members such as wires or lines 36. The reinforcing lines 36 are wound circumferentially around the pipe 10 to traverse the rods 32. It is desirable to have at least two of the lines 36 cross each rod 32 and they may cross at the respective ends of the rods with a third line at approximately the center of the rods. Thus, the lines 36 cooperate with the rods 32 to provide what may be considered to be a plurality of reinforcing bands 38 disposed generally in end-to-end relationship along the length of the pipe. The spacing and rod lengths may be selected so that the rods of one band 38 are intermediate the rods of an adjacent band 38 and the one band overlaps the adjacent band.

The rods 32 are projected onto the coating material as the lines 36 are wound onto the pipe and the timing is such that the material and lines bind the rods into place in the coating almost immediately after the rods impinge against surface 22. It may also be desirable in some cases to provide a more or less conventional warping mechanism, illustrated schematically and designated by the numeral 40, to interweave the rods with the lines 36 prior to application so that the rods are drawn with the lines onto the pipe. The warping action of the mechanism 40 results in every other rod 32 projected from the head 30 being disposed intermediate the center line 36 and the two end lines 36 as best illustrated in FIG. 3. The under and over relationship of the center line 36 to the rods 32 which is accomplished by the warping action serves to unite the composite bands 38 and facilitates retention of the rods on the surface 22. In certain instances, however, it may be desirable to simply wind each of the lines 36 over the rods 32 without the benefit of the warping action and resulting interwoven effect.

It will be appreciated that the reinforcing structure presented by the bands 38 imbedded in the coating 14 can be formed from rods 38 and tie lines 36 of considerably larger diameter than the diameter of wire heretofore used in forming wire mesh. Thus it is not necessary to galvanize either the lines 36 or the rods 32 to protect them from rust since normal amounts of rust or similar deterioration can be tolerated without danger of substantially weakening the reinforcing structure. Both the wire tie lines 36 and the rods 32 can be selected from conventional readily available stock and it is contemplated that in certain applications it will be desirable to form the rods 32 into the desired lengths immediately prior to depositing them onto the coating 14. This could be accomplished by apparatus similar to conventional nailing machines where nails are formed from wire stock as they are used by the machine.

An alternative form of carrying out the invention is illustrated in FIG. 4 wherein a pipe joint 10 is again moved longitudinally of a coating station 12 for application of a coating material 14, in the same manner as previously described for the embodiment of FIGS. 1-3. In the embodiment of FIG. 4, however, the rod thrower 26 is eliminated and a spool 42 is disposed above the coating station 12, with both the rods 32 and the wire tie lines 36 wound therearound. The rods 32 are secured to the tie lines 36 by appropriate spot welds or the like at the ends of each of the rods 32. Only two of the lines 36 are utilized in the example shown, it being recognized that additional lines might be used if deemed desirable. One of these lines is secured to the rods 32 with a degree of slack to accommodate winding of the reinforcement assembly on surface 22 and the resulting increased circumferential spacing between the outermost ends of the rods because of the frusto-conical configuration of surface 22. The slack in wire 36 disposed to ultimately expand to provide the convolution of greatest diameter can be accommodated by simply bending the wires between successive rods so that the composite assembly may be wound on a rod or spool for convenient handling prior to use. Tension on the bent wire straightens the bends to expand that side of the assembly as the reinforcement is drawn relatively taut onto the frusto-conical surface 22 by rotation of the pipe.

Thus the rods 32 and tie lines 36 are placed on the coating 14 in the alternative embodiment by simply unwinding the spool 42 in a helical configuration to present a plurality of end-to-end, circumferential reinforcing bands 38 along the length of the pipe 10. Again, the rods 32 are placed on the coating 14 at an angle corresponding to the angle of application of the coating so that the rods lie essentially flat on surface 22.

Figure 6:
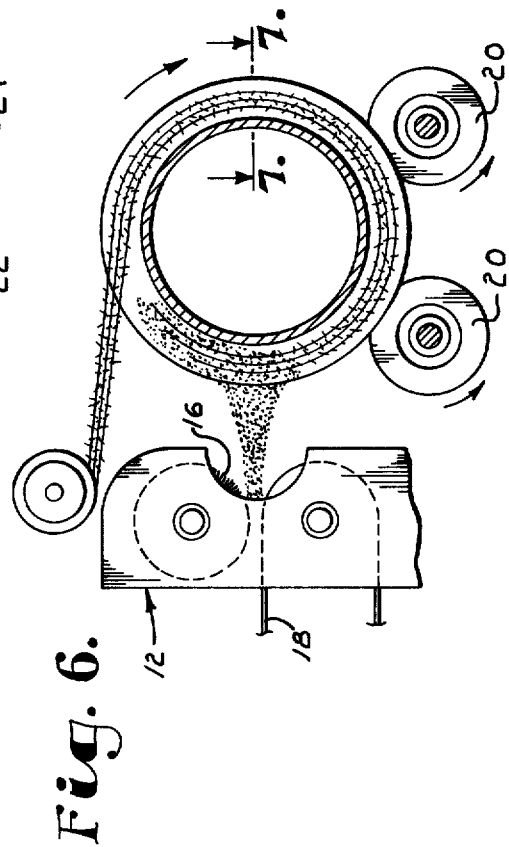
FIG. 6 is a vertical cross-sectional view through a joint of pipe taken along line 5—5 of FIG. 5.
Figure 7:
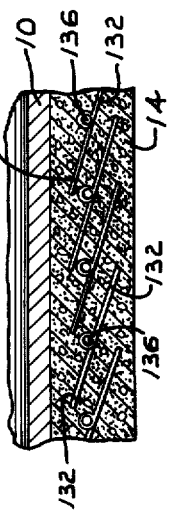
FIG. 7 is a greatly enlarged fragmentary cross-sectional view taken along line 7—7 of FIG. 6.

Still another alternative embodiment of the invention is illustrated in FIGS. 5-7. Spools 134 are positioned immediately above coating station 12 in an analogous position to spools 34 described above. Spools 134, however, carry continuous lengths of strand wire 136 or the like, the construction of which is best understood by viewing FIG. 7. Each strand 136 has secured thereto at spaced intervals along its length transversely extending elongated projections 132. Wire 136 is applied to pipe 10 in generally the same manner as wires 36 described above. Thus, simultaneously with the application of coating material 14 and translational and longitudinal advancement of pipe 10, wire 136 is wrapped around the pipe in a helical fashion along surface 22. Wire 136 is tensioned to draw it taut as it is wrapped around the pipe to assure that the coating material 14 will be held in place.

It is desirable to bring the wires 136 on adjacent spools 134 to a point of convergence as they contact surface 22 so that the projections 132 on one wire will overlie the next adjacent convolution of a strand 136 immediately ahead of it. Manifestly, the projection 132 extending in the opposite direction will underlie the next adjacent convolution of a strand 136 immediately behind it. This assures maximum reinforcing strength.

It has also been found desirable to arrange projections 132 in a random fashion along the length of wire strands 136 to project from the latter at different angles while being disposed in the general direction of the longitudinal dimension of pipe 10. This provides for a reinforcing "network" comparable in strength to previously used wire meshes.

Figure 8:
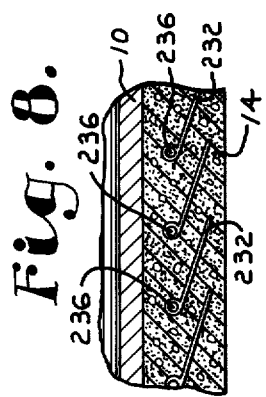
FIG. 8 is another enlarged fragmentary cross-sectional view, similar to FIG. 7, showing a modified form of the reinforcement structure of the invention.

Still another alternative form of the invention is illustrated in FIG. 8. Here, wire strands 236 are utilized to reinforce the coating material 14. Each strand 236 has a transversely extending elongated projection 232 extending from the strand in one direction. Thus, when wire strands 236 are wound around a pipe 10 as the latter is being coated with material 14, each wire 236 is disposed so that a projection 232 will be disposed in overlying relationship to a strand 236 of a next adjacent convolution. Although the reinforcing characteristics of wires 236 are not as great as wires 136, in some applications they meet the necessary requirements for providing adequate reinforcing.

It should be appreciated that various materials may be utilized for the reinforcing provided by wires 36, 136, and 236 as well as the corresponding longitudinally extending components such as rods 32, and projections 132 and 232. While standard wire stock is contemplated as a highly desirable material as presently available, it is also contemplated that synthetic manmade materials such as fiberglass could be utilized to reinforce the pipe coating. While reference has been made to a wire "strand" in the foregoing description, the invention should not be deemed limited to elongated wires or the like consisting of multiple strands or filaments but is intended to cover any "strand-like" material in the sense of being relatively thin and elongated. While the rods 32 have been shown disposed in transverse relationship to wires 36 and in parallel relationship with one another, it should also be appreciated that rods 32 may be disposed at different transverse angles along the convolutions of wire strands 36, while still extending generally in the direction of the longitudinal dimension of pipe 10. This would be similar to the disposition of projections 132 on wires 136 as illustrated in FIG. 5. While one particular method of applying the concrete coating to the pipe has been described, it will be appreciated that other methods, well known to those skilled in the art can also be utilized.

Manifestly, the invention also contemplates a method of reinforcing a coating on the outer surface of a pipe, utilizing a reinforcing material comprising a continuous length of strand having transversely elongated projections extending outwardly therefrom at intervals along the length of the strand. The method includes the steps of projecting a coating material onto the surface of the pipe while simultaneously rotating the pipe and advancing the pipe longitudinally. Also, simultaneously with projection of the coating, the wire strand is wound around the pipe in a plurality of longitudinally spaced convolutions with the projections 132 extending in one direction overlying the next adjacent convolution while the projections extending in the opposite direction underlie the next adjacent convolution on the other side of the strand. The strand is also tensioned as it is wound around the pipe to draw it taut and assure support for the reinforcing material as the latter is projected onto the surface of the pipe.

Having thus described the invention, I claim:

1. A method of reinforcing a coating on the outer surface of a pipe, utilizing a reinforcing material comprising a single continuous length of unitary strand material having transversely extending elongated strand projections extending outwardly therefrom in random directions at intervals along the length of the strand material, each of said projections being secured to said material at a point intermediate the ends of the strands, with said ends being unattached, said method comprising the steps of:
   directing a coating material onto the outer surface of the pipe in a manner to build up a unitary layer of coating material while the latter assumes a frustoconical configuration at the area of application to the pipe surface;
   winding said unitary strand material around the coating material at the area of application of the latter to the pipe whereby said strand projections rest on said coating material in random directions in a plane generally parallel to the frustoconical surface presented by the coating material,
   spacing the convolutions of said strand material so as to place at least some of said strand projections of one convolution in overlying relationship to a next adjacent convolution;
   said directing and winding steps being performed simultaneously; and
   tensioning said strand to draw the latter taut around the coated pipe whereby said reinforcing material at least partially supports said coating material on the surface of the pipe.

2. A method as set forth in claim 1, wherein said projections extend from said strand in two opposing directions, and said winding step includes winding said strand to place said projections extending in one direction in overlying relationship to an adjacent convolution on one side of the strand and said projections extending in the opposite direction being placed in disposition to underlie the next adjacent convolution on the other side of the strand.

3. A method as set forth in claim 2, wherein said winding step comprises simultaneously rotating said pipe and advancing said pipe longitudinally whereby to wind said strand around the pipe in a spiral configuration.

* * * * *